United States Patent Office 3,026,829
Patented Mar. 27, 1962

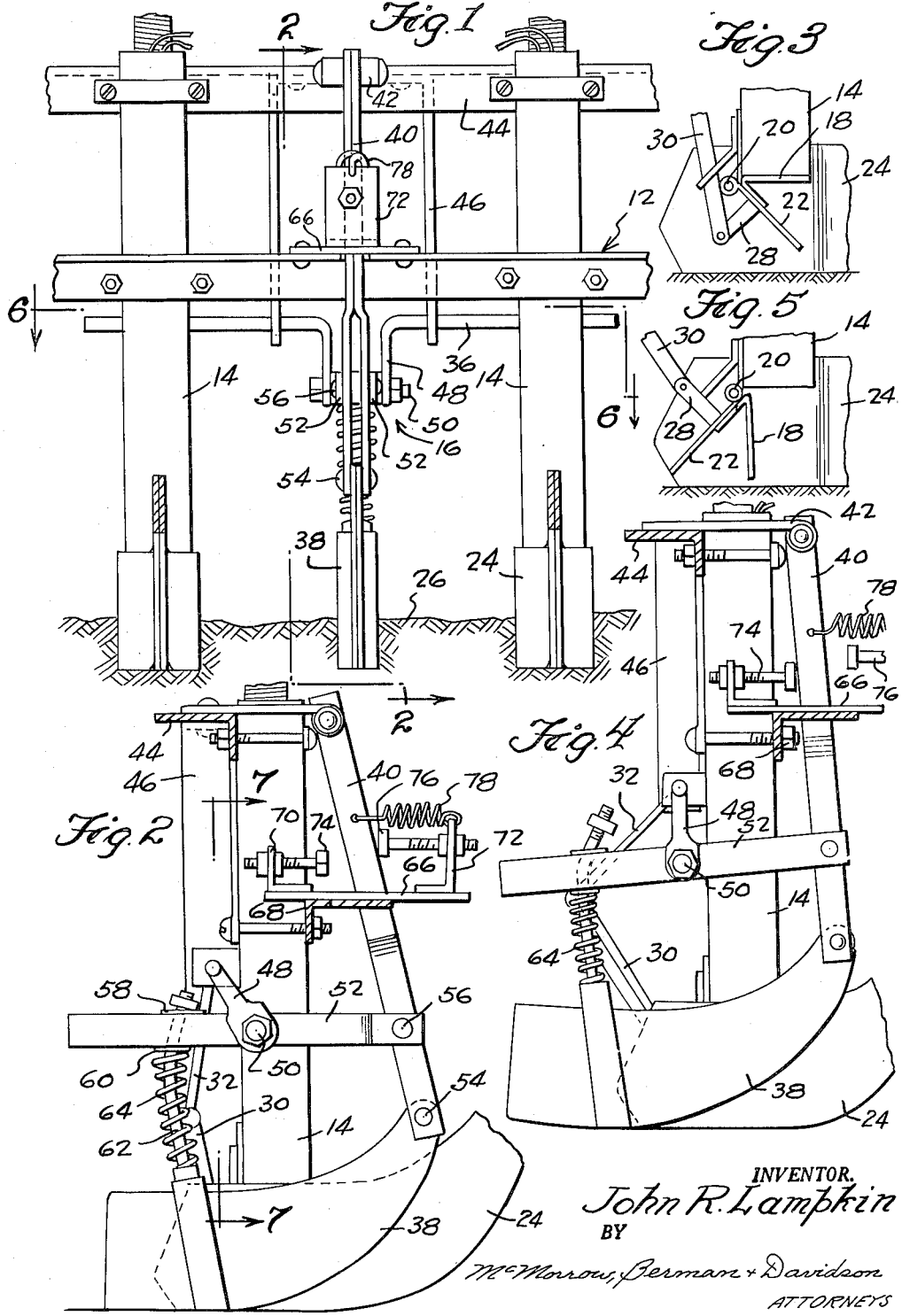

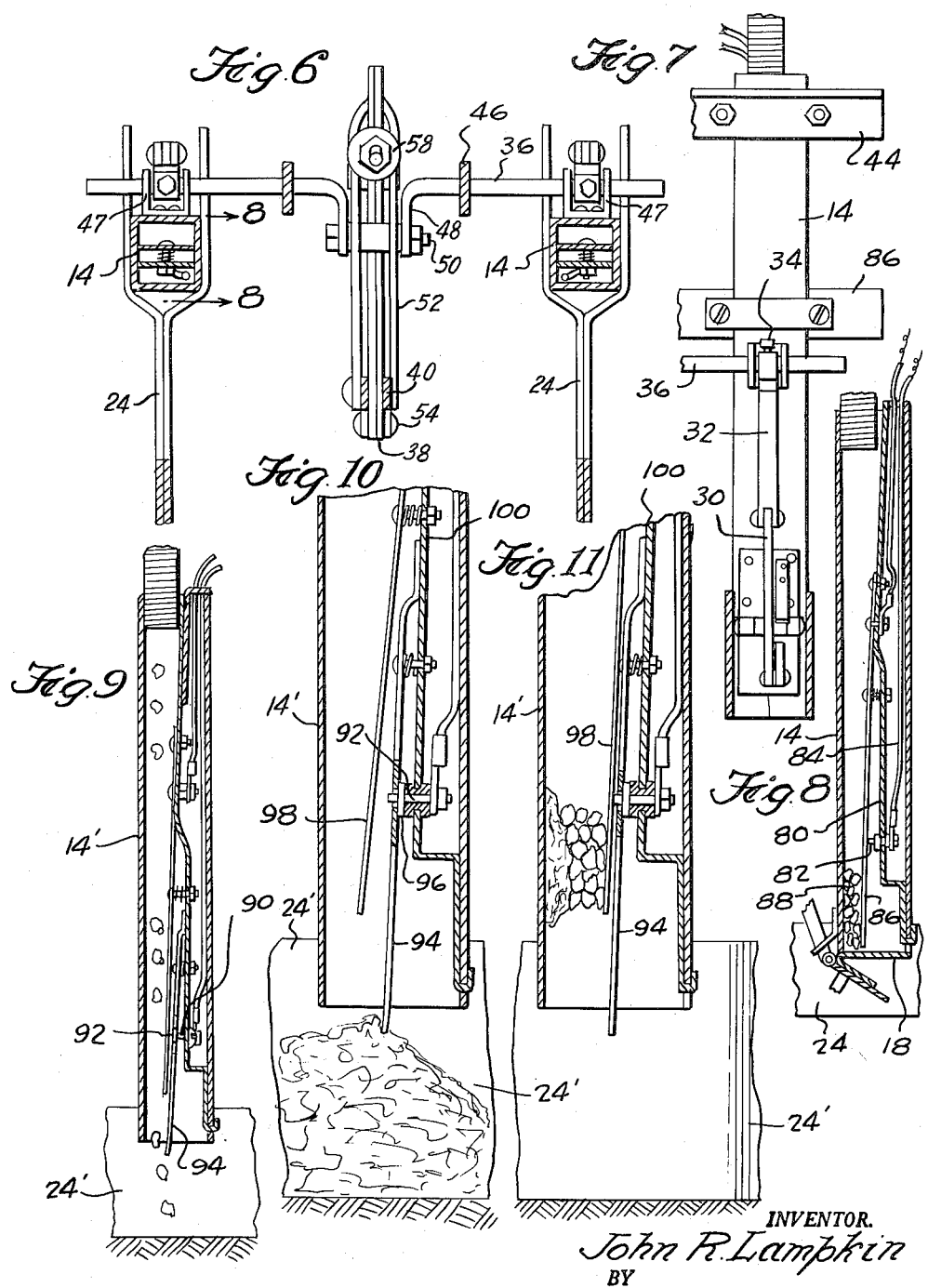

3,026,829
SEED PLANTER ATTACHMENT
John R. Lampkin, 317 S. Main St., Henderson, Ky.
Filed Jan. 15, 1960, Ser. No. 2,767
3 Claims. (Cl. 111—85)

The present invention relates to planters generally, such as a corn drill, and specifically to an attachment to prevent clogging of the seed dispensing chute of such a drill.

Corn drills, and other seed planters, generally have seed dispensing chutes for conveying seed to a runner or shoe which opens a furrow in the ground. It is necessary to raise the chutes and shoes out of ground-engaging position at the end of one row and to lower the same at the start of the next row. In dropping the shoes frequently the shoes have the plowed ground rammed into them and the opening into the lower end of the chute of each runner is clogged with dirt. This often escapes the notice of the operator of the corn drill and seed instead of being discharged into the furrow accumulates up the seed chute, skipping an entire furrow for the length of the row or until the operator has become aware that the chute is clogged.

An object of the present invention is to provide an attachment for a seed planter such as a corn drill or the like having seed dispensing chutes, the attachment preventing ingress of dirt and trash into the lower end of the seed dispenser chute.

Another object of the present invention is to provide, in a corn drill or the like, an indicator for warning the operator of the corn drill when the seed dispensing chute or ground-engaging shoe has become filled with trash or soil.

A further object of the present invention is to provide an attachment for a corn drill or the like which closes the seed dispensing chute when the drill is raised at the end of a row, and one which opens the chute when a new row is started.

A still further object of the present invention is to provide an attachment for a corn drill or the like having seed dispensing chutes which closes the chute automatically upon backward movement of the corn drill over a ground surface.

These and other objects and advantages of the present invention will be fully apparent from the following description when taken in conjunction with the annexed drawings, in which:

FIGURE 1 is a fragmentary view in elevation of a portion of a corn drill, with the attachment of the present invention installed thereon, the seed dispensing chutes and the runner of the present invention being shown in ground-engaging position in full lines and out of ground-engaging position in dotted lines.

FIGURE 2 is a view taken on the line 2—2 of FIGURE 1 with the runner of the attachment shown in the position in which the seed dispensing chute gate is closed.

FIGURE 3 is a fragmentary view in elevation showing the seed dispensing chute in closed position.

FIGURE 4 is a fragmentary view in elevation showing the runner of the attachment in the position in which the gate is open.

FIGURE 5 is a fragmentary elevational view showing the gate open.

FIGURE 6 is a view taken on the line 6—6 of FIGURE 1.

FIGURE 7 is a view taken on the line 7—7 of FIGURE 2.

FIGURE 8 is a view taken on the line 8—8 of FIGURE 6, showing accumulated seeds closing the indicator switch.

FIGURE 9 is a sectional view of a seed dispensing chute with the indicator switch of FIGURE 8 installed therein.

FIGURE 10 is a sectional view of a portion of the assembly shown in FIGURE 9, showing the switch operated by trash or soil within the shoe.

FIGURE 11 is a view similar to FIGURE 10 showing the switch operated by an accumulation of trash and seeds in the seed dispensing chute shown in FIGURE 9.

Referring in greater detail to the drawings in which like numerals indicate like parts throughout the several views, in FIGURES 1 to 7, the reference numeral 12 designates generally the frame of a seed planter such as a corn drill or the like. Two seed dispensing chutes 14 are shown, both identical in structure and described with reference to the one to the right in FIGURE 1. It is to be understood that the chutes 14 are carried by the frame 12, and that the frame 12 is movable upwardly and downwardly with respect to a ground surface. Since this is conventional, and forms no part of the invention, this specific structure is not shown and described.

The attachment of the present invention is designated generally by the reference numeral 16 and it includes a gate 18 having one end mounted on a hinge pin 20 secured to the lower end of the chute 14 for swinging movement of the gate 18 from the position closing the lower end of the chute 14, as in FIGURE 3, to a position in which the lower end of the chute 14 is open, as in FIGURE 5. Fixedly secured to the gate 18 is a plate 22 swingable within the confines of the ground-engaging shoe 24 which serves to open the furrow in the ground surface 26 (FIGURE 1) when the chutes 14 are in their lower position.

A bar 28 projects from the rear face of the plate 22 and has its free end connected by a link 30 to the lower end of an arm 32 (FIGURE 7) having its upper end fixedly secured by means of a set screw 34 to a horizontally disposed shaft 36.

Sensing means is provided adjacent the shoes 24 with means connecting the sensing means to the shoes 24 for movement therewith and with means connecting the sensing means to the shoes 24 so that the gate 18 will move to the position closing the lower end of the chute 14 responsive to movement of the corn drill or planter backwardly when the sensing means and the shoes 24 are in ground-engaging position. Also, the gate 18 in each chute 14 will move to the closed position when the aforesaid sensing means and the shoes 24 are shifted out of the ground-engaging position.

This sensing means consists of a runner 38 substantially on the level with the shoes 24 and means connecting the runner 38 to the gates 18 for movement with the latter comprises an upright arm 40 which has its upper end pivotally connected to a bracket 42 supported upon the upper cross-piece 44 of the frame 12, the lower end of the arm 40 being pivotally connected as at 54 to the forward end of the runner 38, FIGURE 2. The shaft 36 has the portion adjacent one end journaled in the free end of one leg of an inverted U-shaped hanger 46 dependingly secured to the cross piece 44, as shown most clearly in FIGURE 1. The free end portion of the shaft 36 is bent downwardly to form a crank arm 48 which has its free end connected by a pin 50 to a horizontally disposed strap member 52 which has its forward end pivotally connected to the arm 40 inwardly of the lower end of the latter.

As shown in FIGURE 1, there are two strap members 52 connected to the arm 40 which is formed of two pieces so that the lower end portion is bifurcated and connected by a loose rivet 54 to the toe of the runner 38. Another loose rivet 56 pivotally connects the forward ends of the strap members 52 to the arm 40.

As shown in FIGURE 2, plate elements 58 and 60 overlie and underlie the parts of the strap members 52 rearwardly of the pin 50. A curved bolt 62 extends through the plate elements 58 and 60 and has its lower end secured to the runner 38 inwardly of the rearward end of the latter. A coiled spring 64 is circumposed about the bolt 62 and bears against the under face of the plate element 60, the spring 64 biasing the runner 38 downwardly with respect to the strap members 52.

The arm 40, strap members 52, crank arm 48, shaft 36, arm 32, link 30, bar 28, and plate 22 constitute the means by which the runner 38 is connected to the gate 18 for movement of the gate 18 from the open position of FIGURE 5, to the closed position of FIGURE 3. By virtue of this means the gates 18, upon backward movement of the runner 38, are swung from the open position to the closed position, and upon forward movement of the runners 38, are swung from the closed position to the open position.

The means connecting the sensing means or runner 38 to the planting shoes 24 so that the associated gate 18 will move to a position closing the lower end of the adjacent chute 14 responsive to the movement of the planter backwardly when the runner 38 and shoe 24 are in ground-engaging position comprises the pivotal connection of the upper end of the arm 40 to the bracket 42 on the cross-piece 44 of the frame 12, and the inverted U-shaped hanger 46 supported from the upper cross-piece 44 of the frame 12 to the legs of which are pivotally supported the shaft 36. As shown in FIGURE 6, the shaft 36 also pivotally extends through a bracket 47 which is affixed to the exterior face of the adjacent chute 14.

Means is operatively connected to the runner 38 for limiting the forward-and-backward movement of the runner relative to the shoe 24. This means is shown most clearly in FIGURES 2 and 4 and it consists in a horizontally disposed longitudinally arranged plate 66 secured to the lower frame cross piece 68 on the forward side of the latter. Secured to the cross piece 68 adjacent each end are L-shaped bracket members 70 and 72 carrying adjustable bolts 74 and 76, respectively, which serve as limiting stops for the movement of the arm 40.

Means is provided operatively connected to the runner 38 for biasing the runner 38 to the position in which the gate 18 is in the closing position with respect to the lower end of the chute 14. Specifically, this means consists in a coiled spring 78 having one end hooked to the upper end of the bracket member 72 and the other end hooked to the adjacent part of the arm 40.

With reference to FIGURE 8, within each chute 14 is an elongated rigid support 80 having its lower end secured by crimping or other means to the chute 14. The support 80 carries, with appropriately arranged insulators, a fixed contact 82 connected by a wire 84 to one side of an electric alarm or indicator. A movable contact arm 86 is secured to the support 80 above the contact 82 and is swingable into and out of engagement with the contact 82 in response to the accumulation of seeds, as at 88, should the gate 18 fail to open and discharge the same. The contact arm 86 is grounded to the vehicle or otherwise connected to the other side of the alarm or indicator and a source of current on the corn drill or on the tractor which tows the corn drill.

With reference to FIGURES 9 to 11, inclusive, a modified form of the switch mechanism, shown in FIGURE 8, is shown in association with another corn drill seed dispensing chute 14'. In this form of the modified switch, the fixed contact 90 is in registry with an aperture 92 in a first contact arm 94.

As shown in FIGURE 10, the fixed contact has a base portion 96 which is contacted by the adjacent part of the contact arm 94 surrounding the aperture 92 when the free projecting end portion of the contact arm 94 is forced toward the fixed contact 92 by reason of accumulation of trash or trash or soil within the shoe 24'.

A second contact arm 98 is also supported upon the elongated support 100 which supports the first contact arm 94. The arm 98 is swingable into and out of engagement with the free end of the fixed contact 92.

As shown in FIGURE 11, when trash and seeds or seeds alone accumulate in the lower end portion of the chute 14', the second contact arm 98 closes the circuit to bring the indicator or alarm to give notice to the operator of the planter that the seeds are not being delivered to the shoe 24' as they should be.

In operation, when the planter or corn drill is towed over a ground surface and seed is distributed to the chutes 14 by the appropriate dispensing mechanism of the planter or drill the seeds fall by gravity through the chutes 14 to the respective shoes 24 and then to the ground surface. When the end of a row is reached and the appropriate mechanism is employed to raise the chutes 14 from the ground-engaging position, the springs 78 on each of the attachments 16 on the corn drill, swing the runners 38 to the position in which the gates 18 close the lower ends of the chutes 14.

Upon the accumulation of trash within the shoes 24 due to the backing up of the corn drill with the chutes 14 in the ground-engaging position, the trash or soil will not enter the lower ends of the chutes 14 and the plate 22 will serve to restrain movement of the trash or soil toward the lower end of the chute 14. Upon resumption of forward movement of the drill, with the chutes 14 in the ground-engaging position, the engagement of the runners 38 with the ground will swing the runners 38 to the rearward position, causing each of the gates 18 to open. If for any reason the linkage connecting the runners 38 to the gates 18 is broken so that one or more gates 18 fails to open, the contact arm 86 will swing to the fixed contact 82 and will close the circuit to the indicator or alarm to serve notice to the operator of the corn drill that one of the chutes is clogged by seeds 88.

In the form of the invention shown in FIGURES 9 to 11, either trash and seeds, if they accumulate within the chute 14' may sound the alarm, or an excess of trash within the chute 24' may sound the alarm.

What is claimed is:

1. The combination with a seed planter having an upstanding seed dispensing chute, and a planting shoe cooperatively arranged with respect to the lower end of said chute and movable into and out of engagement with ground to be seeded, of a normally open gate means disposed adjacent the lower end of said chute and connected to said chute for swinging movement from the open position to a position closing the lower end of said chute, a sensing means embodying a ground-engaging runner pivotally connected at its forward end to said planter for forward and rearward movement and disposed in engagement with the ground and adjacent said shoe, spring means connected between said planter and said runner for biasing said runner to the forward-movement position, and means connecting said gate to said runner so that said gate will move to a position closing the lower end of said chute responsive to movement of said runner upon backward movement of said planter when said runner and shoe are in ground-engaging position.

2. The combination with a seed planter having an upstanding seed dispensing chute, and a planting shoe cooperatively arranged with respect to the lower end of said chute and movable into and out of engagement with ground to be seeded, of a normally open gate means disposed adjacent the lower end of said chute and connected to said chute for swinging movement from the open position to a position closing the lower end of said chute, sensing means embodying a ground-engaging runner pivotally connected at its forward end to said planter for forward and rearward movement and disposed in engagement with the ground and adjacent said shoe, spring means connected between said planter and said runner for biasing said runner to the forward-movement position, spaced stop means connected to said planter and engageable with said runner for limiting the forward and backward movement of said runner, and means connecting said gate to said runner so that said gate will move responsive to movement of said runner, said gate being movable to a position closing the lower end of said chute responsive to backward movement of said runner and being movable to a position opening the lower end of said chute responsive to forward movement of said runner.

3. The combination with a seed planter having an up standing seed dispensing chute, and a planting shoe cooperatively arranged with respect to the lower end of said chute and movable into and out of engagement with ground to be seeded, of a normally open gate means disposed adjacent the lower end of said chute and connected to said chute for swinging movement from the open position to a position closing the lower end of said chute, a sensing means embodying a ground-engaging runner pivotally connected at its forward end to said planter for forward and rearward movement and disposed in engagement with the ground and adjacent said shoe, stop means embodying spaced bolts adjustably connected to said planter and engageable with said runner for limiting the forward and backward movement of said runner, means connecting said gate to said runner so that said gate will move responsive to movement of said runner, said gate being movable to a position closing the lower end of said chute responsive to backward movement of said runner and being movable to a position opening the lower end of said chute responsive to forward movement of said runner, and spring means connected between said planter and said runner.

References Cited in the file of this patent
UNITED STATES PATENTS

| | | |
|---|---|---|
| 789,798 | Deterding | May 16, 1905 |
| 909,137 | Bellerive | Jan. 12, 1909 |
| 2,533,374 | Hyland | Dec. 12, 1950 |
| 2,554,205 | Oehler | May 22, 1951 |
| 2,756,702 | Brinton | July 31, 1956 |
| 2,869,491 | Orendorff | Jan. 20, 1959 |
| 2,907,015 | Young | Sept. 29, 1959 |